United States Patent [19]
Reeder

[11] Patent Number: 6,040,076
[45] Date of Patent: Mar. 21, 2000

[54] ONE PIECE FUEL CELL SEPARATOR PLATE

[75] Inventor: Kenneth W. Reeder, Hobart Lake, Ind.

[73] Assignee: M-C Power Corporation, Burr Ridge, Ill.

[21] Appl. No.: 09/033,761

[22] Filed: Mar. 3, 1998

[51] Int. Cl.⁷ .............................. H01M 2/08; H01M 2/14
[52] U.S. Cl. ............................................... 429/35; 429/38
[58] Field of Search ................................. 429/34–36, 38, 429/39

[56] References Cited

U.S. PATENT DOCUMENTS

| | | |
|---|---|---|
| 4,431,714 | 2/1984 | Myerhoff . |
| 5,045,413 | 9/1991 | Marianowski et al. . |
| 5,077,148 | 12/1991 | Schora et al. . |
| 5,084,364 | 1/1992 | Quaadvliet . |
| 5,100,743 | 3/1992 | Narita et al. . |
| 5,227,256 | 7/1993 | Marianowski et al. . |
| 5,273,837 | 12/1993 | Aitken et al. . |
| 5,338,621 | 8/1994 | Bossel . |
| 5,342,706 | 8/1994 | Marianowski et al. . |
| 5,362,578 | 11/1994 | Petri et al. . |
| 5,384,208 | 1/1995 | Brand et al. . |
| 5,405,712 | 4/1995 | Yoshimura et al. . |
| 5,795,665 | 8/1998 | Allen ...................................... 429/34 X |
| 5,906,898 | 5/1999 | Pondo ...................................... 429/34 |

*Primary Examiner*—Donald R. Valentine
*Attorney, Agent, or Firm*—Pauley Petersen Kinne & Fejer

[57] ABSTRACT

A separator plate for an internally manifolded fuel cell stack comprising a centrally disposed active region, a peripheral seal region, and forming at least one pair of perforations substantially geometrically disposed on opposite sides of the centrally disposed active region. The peripheral seal region comprises a peripheral seal structure on each face of the separator plate completely around the periphery of each said face. A manifold seal region in each face completely encloses each perforations, the manifold seal region comprising conduits on one of said faces for communication of a gas between the centrally disposed active region and at least the one pair of perforations. The separator plate is comprised of one sheet of a material suitable for use as a separator plate, preferably a pressed sheet metal.

21 Claims, 3 Drawing Sheets

ONE PIECE FUEL CELL SEPARATOR PLATE

BACKGROUND OF THE INVENTION

1. Field of the Invention

This invention relates to a separator plate for a fuel cell stack, preferably an internally manifolded molten carbonate fuel cell stack. This invention also relates to subassemblies of an anode/current collector/separator plate/current collector/cathode therefore which upon assembly provide effective sealing between said fuel cell components. The subassemblies provide ease of assembly resulting in reduced labor costs and long-term stability while the separator plate design simplifies the design of the interacting fuel cell components, reduces the assembly time in constructing a fuel cell stack, improves sealing by using a rigid and increased sealing area, prevents electrode creeping, eliminates the "cookie cutter" effect, and eliminates the internal resistance within each cell.

Generally, fuel cell electrical output units are comprised of a stacked plurality of individual cells separated by inert or bi-polar electronically conductive ferrous metal separator plates. Individual cells are sandwiched together and secured into a single stacked unit to achieve desired fuel cell energy output. Each individual cell generally includes an anode and cathode electrode, a common electrolyte tile or matrix, and a fuel and oxidant gas source. Both fuel and oxidant gases are introduced through manifolds to their respective reactant chambers between the separator plate and the electrolyte tile or matrix. In order to ensure proper functioning of the fuel cell stack, seals between the various cell components are required to maintain separation of the fuel and oxidant gases and prevent and/or minimize gas leakage.

This invention provides fully internal manifolding of the fuel and oxidant gases to and from the individual cells of an assembled fuel cell stack in a manner, due principally to the design of the separator plate, which provides ease of assembly, long-term endurance, stability of fuel cell operation, and a reduced number of individual cell components, thereby eliminating fit up problems between the various cell components.

2. Description of Prior Art

Commercially viable molten carbonate fuel cell stacks may contain up to about 600 individual cells, each having a planar area in the order of at least eight square feet. In stacking such individual cells, separator plates separate the individual cells with fuel and oxidant each being introduced between a set of separator plates, the fuel being introduced between one face of a separator plate and the anode side of an electrolyte matrix and oxidant being introduced between the other face of the separator plate and the cathode side of a second electrolyte matrix. Due to the thermal gradients between cell assembly and cell operating conditions, differential thermal expansions, and the necessary strength of materials used for the manifolds, close tolerances and very difficult engineering problems are presented.

Various means of sealing in the environment of high temperature fuel cells are taught, for example, by U.S. Pat. No. 5,342,706, U.S. Pat. No. 5,077,148, U.S. Pat. No. 5,045,413, and U.S. Pat. No. 5,227,256, all of which teach an internally manifolded fuel cell stack design utilizing a wet seal approach to sealing of the fuel cell stack. All of the separator plates taught by these U.S. patents are multi-piece separator plates. Multi-piece separator plates are also taught by U.S. Pat. No. 5,338,621.

U.S. Pat. No. 5,384,208 teaches a cell structure for electrolyzer units and fuel cells comprising an electrolyte-permeable diaphragm, one metallic, electrolyte-permeable electrode respectively on either side of the diaphragm, an electrically conductive bi-polar cell partition respectively which bounds the cells, one electrically conductive structure respectively between the electrode and the cell partition which acts as an elastic spacer and current supply, and a frame construction which encloses the cell on the circumference side. The cell partitions are constructed of sheet metal and, if necessary, spacers. The cell partition is constructed as a simple flat impermeable sheet metal plate.

U.S. Pat. No. 5,273,837 teaches a thermal-shock-resistant fuel cell design comprising flat and corrugated ceramic sheets combined to form channeled structures, the sheets being provided as thin, flexible ceramics and being particularly effective when used as components of compliant electrolyte substructures incorporating the flexible ceramics with fuel cell electrodes and/or current conductors bonded thereto. And, finally, U.S. Pat. No. 5,084,364 teaches a separator plate for stacking molten carbonate fuel cells having openings for fuel inlet and fuel outlet and oxidant inlet and oxidant outlet, the gas passages through the separator plate having a spring characteristic as a result of choosing a suitable profile therefore and as a result of a frame-type spring which is disposed around the active cell assembly, which frame-type spring contains built-in components for conveying the process gases where the profile of the frame spring is matched to the spring characteristic of the gas passage.

SUMMARY OF THE INVENTION

It is an object of this invention to provide a bi-polar separator plate for a fuel cell which simplifies the design of interacting components in a fuel cell and, at the same time, reduces its cost.

It is another object of this invention to provide a bi-polar separator plate for a fuel cell which reduces the assembly time for construction of a fuel cell stack.

It is yet another object of this invention to provide a bi-polar separator plate for a fuel cell which improves sealing by using a rigid and increased sealing area compared to conventional sealing mechanisms.

It is yet another object of this invention to provide a bi-polar separator plate for a fuel cell which prevents electrode creeping.

It is yet another object of this invention to provide a bi-polar separator plate for a fuel cell which eliminates the "cookie cutter" effect.

Finally, it is an object of this invention to provide a bi-polar separator plate for a fuel cell which eliminates the internal resistance within each cell.

These and other objects of this invention are achieved by a separator plate for an internally manifolded fuel cell stack in accordance with this invention, the separator plate comprising a centrally disposed active region, a peripheral seal region, and forming at least one pair of substantially geometrically disposed perforations on opposite sides of the centrally disposed active region. The peripheral seal region comprises a peripheral seal structure on each face of the separator plate which extends completely around the periphery of each face of the separator plate. The separator plate further comprises a manifold seal region on each face completely surrounding each perforation. The manifold seal region comprises communication means on one of the faces of the separator plate for communication of a gas between the centrally disposed active region and said at least one pair of perforations. All of these features are comprised by a separator plate formed of one sheet of a material suitable for use as a separator plate in a fuel cell stack.

In a fuel cell stack comprising a plurality of fuel cell units, each said fuel cell unit comprising an anode and a cathode, an electrolyte in contact on one side with an electrolyte facing face of the anode and in contact on the opposite side with an electrolyte facing face of the cathode, the separator plate of this invention separates the fuel cell units between the anode of one fuel cell unit and the cathode of an adjacent fuel cell unit, forming an anode chamber between the anode facing face of the separator plate and the anode and forming a cathode chamber between the cathode facing face of the separator plate and the cathode of the adjacent fuel cell unit. The anode chamber is in gas communication with a fuel gas supply and outlet and the cathode chamber is in gas communication with an oxidant gas supply and outlet. The anodes, cathodes, and separator plates extend to the peripheral edge of the fuel cell stack. The separator plate comprises one sheet of a material suitable for use as a separator plate. The separator plate has a centrally disposed active region and a peripheral seal region, the peripheral seal region sealing against an adjacent fuel cell component, either an electrode or a current collector, on each side of the separator plate. The electrodes and the separator plate form a plurality of aligned perforations. The perforations in the separator plate are surrounded by a manifold seal region on each face of the separator plate. The manifold seal region seals against the adjacent fuel cell components on both sides of the separator plate, thereby forming, together with the electrodes, a plurality of gas manifolds extending through the fuel cell stack.

BRIEF DESCRIPTION OF THE DRAWINGS

These and other objects and features of this invention will be better understood from the following detailed description taken in conjunction with the drawings, wherein.

DESCRIPTION OF PREFERRED EMBODIMENTS

Figure 1:
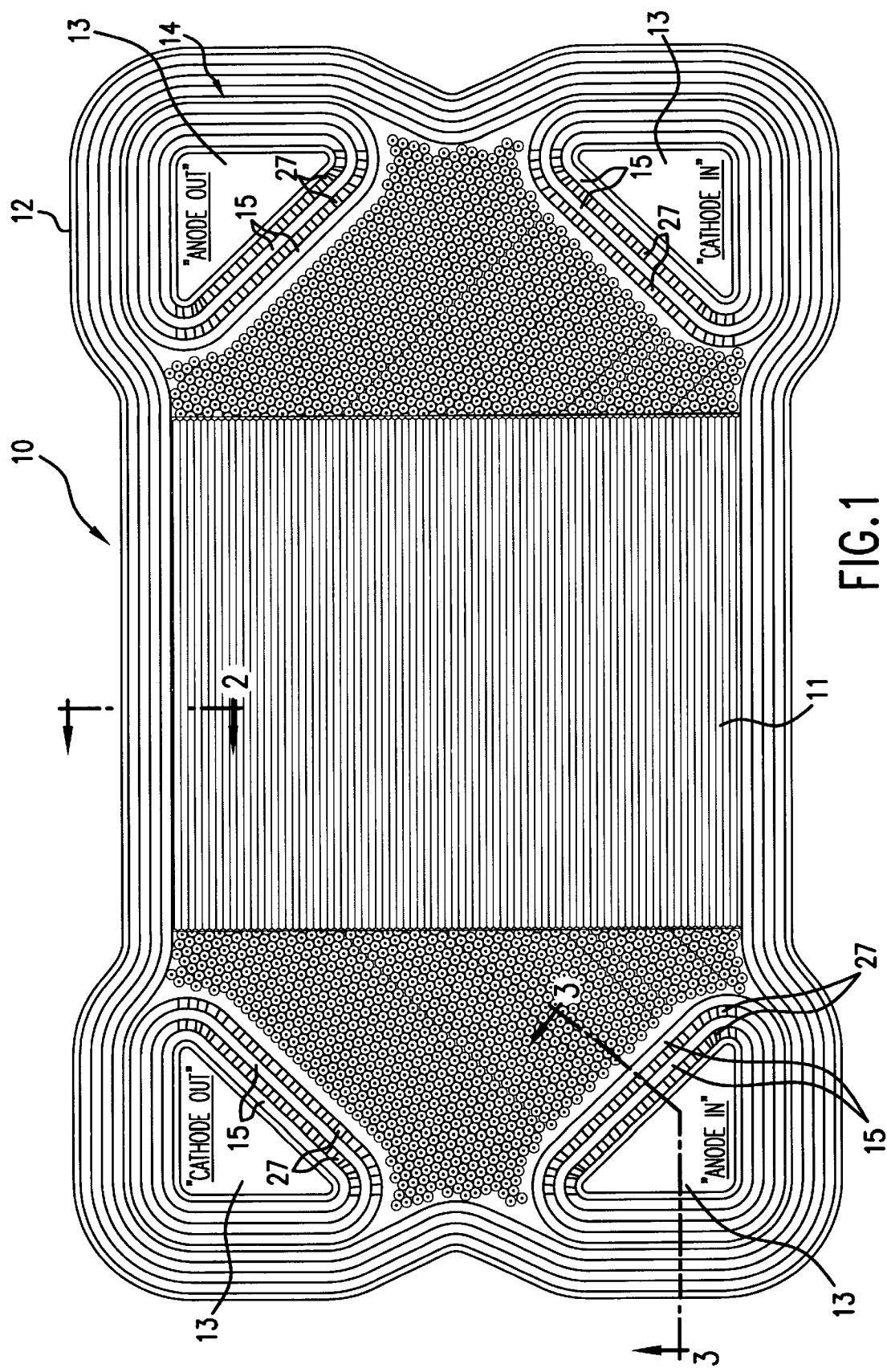
FIG. 1 is a plan view of a separator plate for a fuel cell stack in accordance with one embodiment of this invention.

A one-piece separator plate 10 for an internally manifolded fuel cell in accordance with one embodiment of this invention is shown in FIG. 1. Separator plate 10 comprises a centrally disposed active region 11 and peripheral seal region 12 which extends completely around the periphery of separator plate 10. Separator plate 10 forms at least one pair of perforations 13 substantially geometrically disposed on opposite sides of active region 11. In this way, a reactant gas passing through one of said perforations passes through active region 11 and out through the perforation 13 on the opposite side of active region 11.

Figure 2:
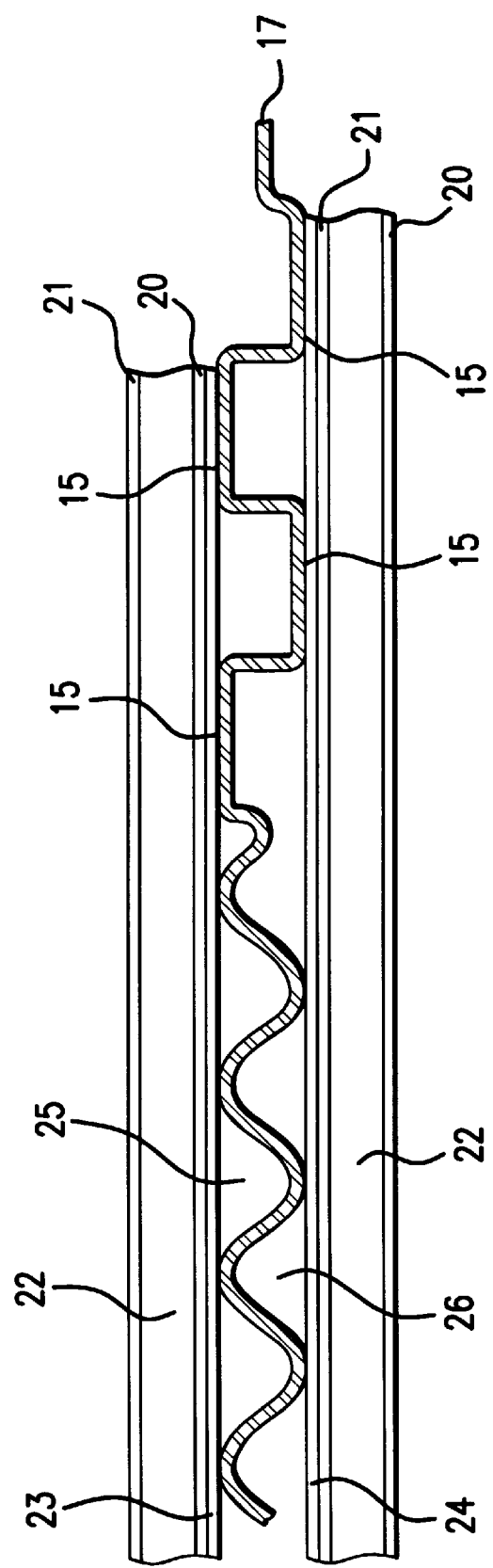
FIG. 2 is a cross-sectional view of the separator plate shown in FIG. 1 along the line A—A in combination with the electrolyte, electrodes and current collector of a portion of a fuel cell stack in accordance with one embodiment of this invention.

Peripheral seal region 12 comprises peripheral seal structure 17 on each face of separator plate 10 completely around the periphery of each said face of separator plate 10, peripheral seal structure 17 comprising flattened peripheral seal structures 15, as shown in FIG. 2, for sealing against adjacent fuel cell components facing each face of separator plate 10.

Each perforation 13 is surrounded on each face of separator plate 10 by manifold seal structure 14, manifold seal structure 14 comprising flattened manifold structures 16a, 16b which form communication means 27 on each of the faces of separator plate 10 for communication of a gas between active region 11 on each face of separator plate 10 and at least one pair of perforations 13.

The unique feature of the separator plate of this invention is that all of the elements of separator plate 10 as set forth hereinabove are provided in a separator plate comprised of one sheet of a material suitable for use as a separator plate. Conventional fuel cell separator plates having all of these features heretofore have been constructed of a plurality of pieces as taught, for example, by U.S. Pat. No. 5,362,578, in contrast to the single sheet of material utilized for the construction of a separator plate in accordance with this invention.

In accordance with a preferred embodiment of this invention, said sheet of material is made of a shapable metal. In accordance with a particularly preferred embodiment of this invention, separator plate 10 is a pressed sheet metal.

In order to provide an effective peripheral seal between separator plate (10) and adjacent fuel cell components, as shown in FIG. 2, peripheral seal structure 17 comprises at least two substantially parallel flattened peripheral seal structures 15 on each face of separator plate 10 completely around the peripheries thereof.

Figure 3:
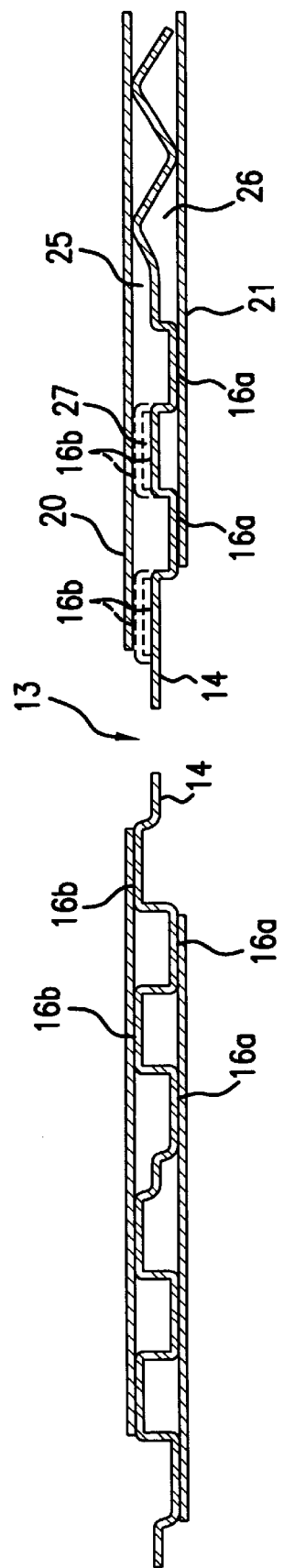
FIG. 3 is a cross-sectional view of the separator plate shown in FIG. 1 taken along the line B—B.

A fuel cell stack utilizing a separator plate in accordance with one embodiment of this invention comprises a plurality of fuel cell units, each of which comprises an anode 20, cathode 21, and an electrolyte 22 in contact on one side with an electrolyte facing face of anode 20 and in contact on the opposite side with an electrolyte facing face of cathode 21 as shown in FIG. 2. Separator plate 10 separates the fuel cell units between anode 20 and cathode 21, forming anode chamber 25 between the anode facing face of separator plate 10 and anode 20 and forming a cathode chamber 26 between a cathode facing face of separator plate 10 and cathode 21 of an adjacent fuel cell unit. As shown in FIG. 3, anode chamber 25 is in communication with a fuel gas supply, said communication being provided by gas communication means 27 whereby fuel gas from perforation 13 passes through a portion of flattened manifold seal structure 16b into anode chamber 25.

A subassembly for a fuel cell stack in accordance with one embodiment of this invention as shown, for example, in FIGS. 2 and 3, comprises anode 20, cathode 21, and separator plate 10 which form a plurality of aligned perforations 13. Perforations 13 in separator plate 10 are surrounded by manifold seal structure 14 on each face of separator plate 10, manifold seal structure 14 sealing against an adjacent fuel cell component, either an electrode 20, 21 or a current collector 23, 24, forming a plurality of gas manifolds which extends throughout the fuel cell stack. In accordance with one embodiment of this invention, flattened manifold seal structure 16b provides a fuel gas communication between one set of said manifolds and anode chambers 25 on one side of separator plate and flattened manifold seal structure 16a provides oxidant gas communication between a second set of said manifolds and cathode chambers 26 on the other face of separator plate 10, thereby providing fully internal manifolding of fuel and oxidant gases to and from each fuel cell unit in the fuel cell stack.

In accordance with another embodiment of this invention, internal manifolding is provided for fuel gas or oxidant communication to one side of separator plate 10 while the other of fuel gas or oxidant gas is provided to the opposite side of separator plate 10 through an external manifold (not shown).

To provide the required manifold seals, manifold seal structure 14, as previously indicated, provides at least one flattened manifold seal structure 16a, 16b on each face of separator plate 10 around at least a portion of perforations 13 on a side of perforations 13 facing away from centrally disposed active region 11. In an assembled fuel cell stack, flattened manifold seal structures 16a, 16b seal against the adjacent fuel cell components on both sides of separator plate 10. In a fuel cell stack in accordance with one embodiment of this invention, high temperature sealing grease is provided between flattened manifold seal structure 16a, 16b and the adjacent fuel cell components in order to enhance the effectiveness of the seal.

As previously indicated, manifold seal structure 14 comprises conduits extending therethrough to provide fuel gas communication between one set of manifolds and anode chambers 25 on one face of separator plate 10 and oxidant gas communication between a second set of manifolds and cathode chambers 26 on the other face of separator plate (10). In accordance with one particularly preferred embodiment of this invention, said conduits comprise a portion of flattened manifold seal structure 16a, 16b of at least one of said set of manifolds facing said centrally disposed active region 11 of separator plate 10 on one face of separator plate 10 being corrugated. Similarly, said conduits comprise a portion of the flattened manifold seal structure 16a, 16b of another set of manifolds facing the centrally disposed active region 11 of separator plate 10 on the opposite face of separator plate 10 being corrugated.

In order to promote even distribution of the gases flowing across centrally disposed active region 11 of separator plate 10, the centrally disposed active region 11 is corrugated.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. In a separator plate for an internally manifolded fuel cell stack, said separator plate comprising a centrally disposed active region, a peripheral seal region, and forming at least one pair of substantially geometrically disposed perforations on opposite sides of said centrally disposed active region, said peripheral seal region comprising a peripheral seal structure on each face of said separator plate completely around the periphery of each said face, a manifold seal structure on each said face completely around each said perforation, said manifold seal structure comprising communication means on one of said faces for communication of a gas between said centrally disposed active region and at least said at least one pair of perforations, the improvement comprising:

said separator plate constructed of one sheet of a material suitable for use as a separator plate.

2. A separator plate in accordance with claim 1, wherein said sheet is made of a shapable metal.

3. A separator plate in accordance with claim 2, wherein said sheet is a pressed metal.

4. A separator plate in accordance with claim 2, wherein said peripheral seal structure comprises at least two substantially parallel flattened seal structures on each said face completely around said peripheries.

5. A separator plate in accordance with claim 1, wherein said manifold seal structure comprises at least one flattened manifold seal structure on each said face around at least a portion of said perforations on a side of said perforations facing away from said centrally disposed active region.

6. A separator plate in accordance with claim 5, wherein said communication means comprises conduits extending across said at least one flattened manifold seal structure on a side of said perforations facing said centrally disposed active region.

7. A separator plate in accordance with claim 1, wherein said centrally disposed active region is corrugated.

8. In a fuel cell stack comprising a plurality of fuel cell units, each said fuel cell unit comprising an anode and a cathode, an electrolyte in contact on one side with an electrolyte facing face of said anode and in contact on the opposite side with an electrolyte facing face of said cathode, and a separator plate separating said fuel cell units between an anode and cathode forming an anode chamber between an anode facing face of said separator plate and said anode and forming a cathode chamber between a cathode facing face of said separator plate and said cathode of an adjacent said fuel cell unit, said anode chamber in gas communication with a fuel gas supply and outlet and said cathode chamber in gas communication with an oxidant gas supply and outlet, said anodes, said cathodes, and said separator plates extending to the peripheral edge of said fuel cell stack, the improvement comprising:

said separator plate comprising one sheet of a material suitable for use as a separator plate, said separator plate having a centrally disposed active region and a peripheral seal structure, said peripheral seal structure sealing against an adjacent fuel cell component facing each face of said separator plate; and said anode, said cathode, and said separator plate forming a plurality of aligned perforations, said perforations in said separator plate being surrounded by a manifold seal structure on each said face of said separator plate, said manifold seal structure sealing against said adjacent fuel cell components forming a plurality of gas manifolds extending through said fuel cell stack.

9. A fuel cell stack in accordance with claim 8, wherein said peripheral seal structure comprises at least two substantially parallel flattened seal structures on each said face completely around said peripheries.

10. A fuel cell stack in accordance with claim 8, wherein said manifold seal structure comprises at least one flattened manifold seal structure on each said face around at least a portion of said perforations on a side of said perforations facing away from said centrally disposed active region.

11. A fuel cell stack in accordance with claim 10, wherein said manifold seal structure further comprises conduits extending through said at least one flattened manifold seal structure providing fuel gas communication between one set of said manifolds and said anode chambers on one face of said separator plates and providing oxidant gas communication between a second set of said manifolds and said cathode chambers on the other face of said separator plates, thereby providing fully internal manifolding of fuel and oxidant gases to and from each said fuel cell unit in said fuel cell stack.

12. A fuel cell stack in accordance with claim 11, wherein said conduits comprise a portion of said flattened manifold seal structure of at least one said set of manifolds facing said centrally disposed region of said separator plates on one face of said separator plate being corrugated and a portion of said flattened manifold seal structure of at least one of another said set of manifolds facing said centrally disposed region of said separator plates on the opposite face of said separator plate being corrugated.

13. A fuel cell stack in accordance with claim 12, wherein said centrally disposed active region of said separator plates is corrugated.

14. A fuel cell stack in accordance with claim 8, wherein a current collector is disposed between each of said anode and said separator plate and said cathode and said separator plate.

15. A fuel cell stack in accordance with claim 14, wherein said current collectors are welded to said separator plate.

16. A subassembly for a fuel cell unit comprising:

an anode, a separator plate, and a cathode, said anode, said separator plate, and said cathode extending to an edge region of a fuel cell stack;

said separator plate comprising a centrally disposed active region and a peripheral seal region, said peripheral seal region comprising a peripheral seal structure on each face of said separator plate completely around the periphery of each said face, said peripheral seal structure sealing against said anode and said cathode;

said anode, said separator plate, and said cathode forming a plurality of aligned perforations, said separator plate comprising a manifold seal structure on each said face of said separator plate completely around each of said perforations, said manifold seal structure comprising a flattened manifold seal structure completely around the periphery of each said perforation, said flattened manifold seal structure sealing against said anode and said cathode;

communication means for providing gas communication between each of said aligned perforations and said centrally disposed active region; and said separator plate comprised of one sheet of a material suitable for use as a separator plate.

17. A subassembly in accordance with claim 16, wherein said sheet is made of a shapable metal.

18. A subassembly in accordance with claim 17, wherein said sheet is a pressed metal.

19. A subassembly in accordance with claim 16, wherein said peripheral seal structure comprises at least two substantially parallel flattened seal structures on each said face completely around said peripheries.

20. A subassembly in accordance with claim 16, wherein said manifold seal region comprises at least one flattened manifold seal structure on each said face around at least a portion of said perforations on a side of said perforations facing away from said centrally disposed active region.

21. A subassembly in accordance with claim 20, wherein said communication means comprises conduits extending across said flattened manifold seal structures.

* * * * *